E. & J. GRAUMANN.
ANT KILLING MACHINE.
APPLICATION FILED JUNE 7, 1918.
1,290,544.
Patented Jan. 7, 1919.
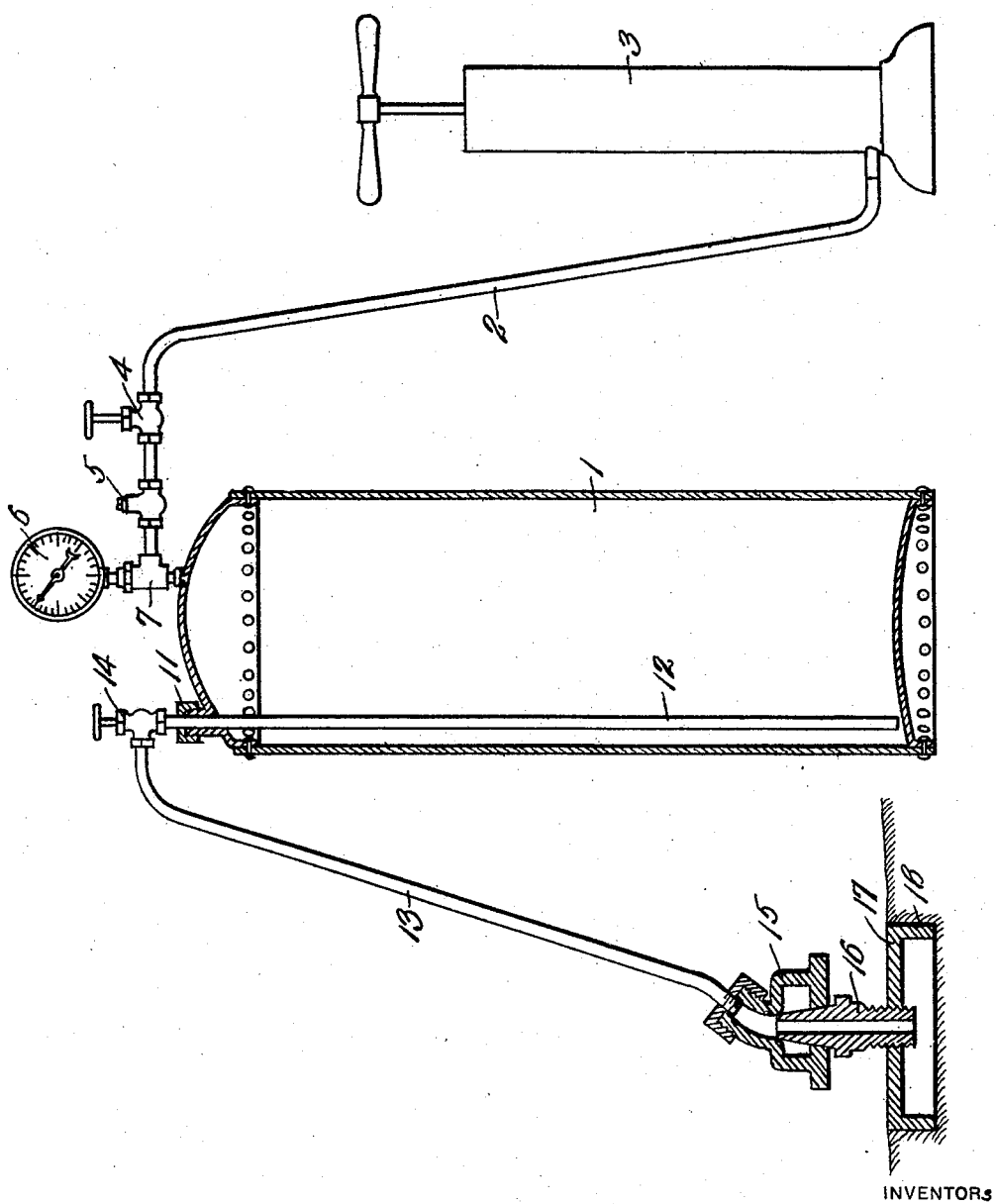
WITNESSES
James F. Crown,
N. L. Collamer
INVENTORS
Edward Graumann
and John Graumann,
BY Richard Owen,
ATTORNEY

UNITED STATES PATENT OFFICE.

EDWARD GRAUMANN AND JOHN GRAUMANN, OF GRANITE, OKLAHOMA.

ANT-KILLING MACHINE.

1,290,544.  Specification of Letters Patent.  Patented Jan. 7, 1919.

Application filed June 7, 1918. Serial No. 238,755.

*To all whom it may concern:*

Be it known that we, EDWARD GRAUMANN and JOHN GRAUMANN, citizens of the United States, residing at Granite, in the county of Greer and State of Oklahoma, have invented certain new and useful Improvements in Ant-Killing Machines, of which the following is a specification.

This invention relates to insect destroyers, and more especially to insecticide distributers; and the object of the same is to produce a portable device of this kind for distributing poisonous liquids or gases onto ant hills and other places where insects and pests are congregated in considerable numbers, or causing such insecticide fluids to permeate the earth under air pressure to destroy the eggs and larvæ.

This object is carried out by constructing the device in the manner hereinafter more fully described and claimed and as shown in the drawings wherein the device is illustrated in vertical section, and the pump in elevation.

The numeral 1 designates an upright metallic tank into whose top opens an inlet pipe 2 leading from a pump 3, herein shown as a hand pump, by means of which compressed air may be forced into the tank.
The pipe is provided with a globe valve 4, a check valve 5 and a pressure gage 6 at the top of the T-coupling 7 by which it is connected with the top of the tank. An outlet pipe 12 extends through a packing gland 11 in the top of the tank and downward nearly to the bottom of the same, and at the upper end of this pipe is a globe valve 14 connecting it with a pipe or hose 13 leading to a coupling 15 for detachable connection with a nipple 16. This nipple rises from the top of what might be called a "head". As herein shown the head is a plate 17 which may be cupped on its under face, a depending flange 18 being here illustrated around the edges of this plate. The latter is of some considerable size, and it may be laid over the ant hill or other spot which it is desired to treat with the liquid or fumes, although we prefer to bury it in the ground with the nipple projecting and allow it to remain there while the pests make their runways, nests, etc.

Into the tank is placed a composition which is poisonous to the insects. We find a very successful mixture to be composed of one gallon of pure coal oil, one pound of lard, and one-half pound of crude oil, well mixed; but do not wish to be limited to the composition or its ingredients.

In use, the poisonous composition is supplied to the tank so as to fill the same nearly full, and pressure is applied to the upper portion of the tank by reciprocations of the handle of the pump. This causes the liquid to flow out the outlet pipe 12 and along the tube 13 to the head, whence it passes down through the nipple and spreads out within the interior of the cupped plate 17, killing the insects and destroying their eggs either by contact of the fluid with them or by means of its fumes or gases, according to what composition is employed. It will be obvious that the entire machine is easy to handle. We do not wish to be limited to the sizes, shapes, proportions or materials of parts.

We have spoken of the element 17 as a "plate" but do not wish to be restricted by this term to metal, as this element may in fact be almost any material, including reinforced cement or the like. We would have it of considerable size, perhaps round in shape and heavy enough to prevent being tipped over in case the animal to be destroyed was of such size that he might rush out of his runway beneath the plate. To recharge the tank, the coupling may be slipped off the nipple and the liquid introduced through the pipe 13, pressure of course being cut off at the valve 4; or the top of the tank may have a filling opening closed by a suitable plug or cap not shown in the drawings.

The foregoing description and the drawings have reference to what may be considered the preferred, or approved form of our invention. It is to be understood that we may make such changes in construction and arrangement and combination of parts, materials, dimensions, et cetera, as may prove expedient and fall within the scope of the appended claims.

Having thus fully described our invention, what we claim as new and desire to secure by Letters Patent, is:—

1. In an insect destroyer, a plate having a hole in its center and a depending flange adapted to be buried in the ground, and means for delivering an insecticide through said hole.

2. The herein described insect destroyer comprising a receptacle for poison, a pipe leading therefrom, a coupling at the outer end of the pipe, and a plate adapted to be buried in the ground and having through it an upstanding nipple for detachable connection with the coupling.

3. In an insect destroyer, the combination with a receptacle for insecticide, an outlet pipe leading therefrom, and a coupling attached to said pipe; of a plate pierced with a central opening and provided around its periphery with a depending flange, and a nipple rising from said opening and detachably connected with the coupling, for the purpose set forth.

In testimony whereof we affix our signatures in presence of two witnesses.

EDWARD GRAUMANN.
JOHN GRAUMANN.

Witnesses:
C. F. LEE,
H. L. DAVIS.

Copies of this patent may be obtained for five cents each, by addressing the "Commissioner of Patents, Washington, D. C."